C. A. WIBERG.
SHOCK ABSORBER.
APPLICATION FILED JUNE 12, 1919.
1,319,938.
Patented Oct. 28, 1919.
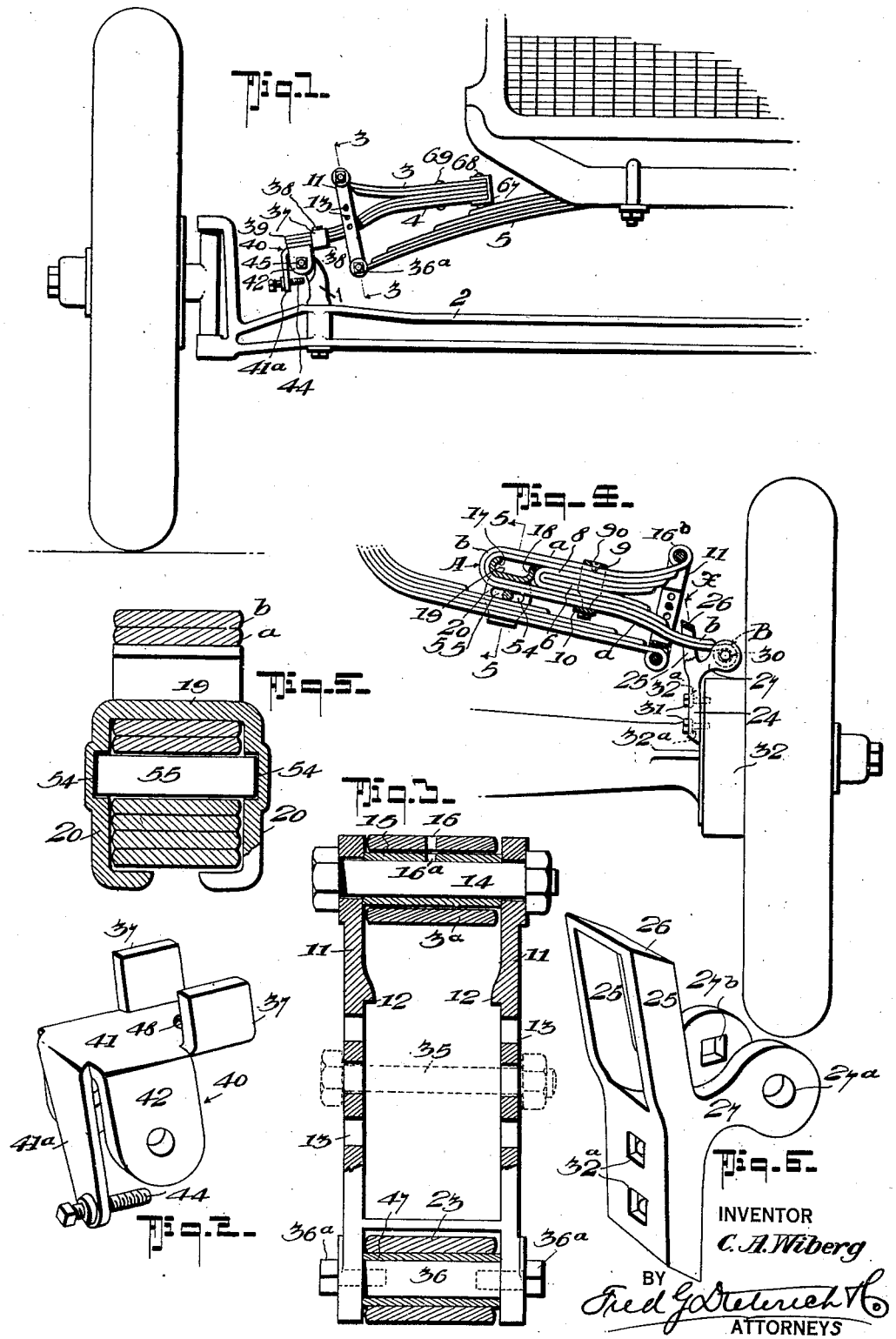
INVENTOR
C. A. Wiberg
BY
Fred G. Dieterich
ATTORNEYS

UNITED STATES PATENT OFFICE.

CHARLES A. WIBERG, OF DULUTH, MINNESOTA.

SHOCK-ABSORBER.

1,319,938.  Specification of Letters Patent.  Patented Oct. 28, 1919.

Application filed June 12, 1919. Serial No. 303,605.

*To all whom it may concern:*

Be it known that I, CHARLES A. WIBERG, a citizen of the United States, residing at Duluth, in the county of Saint Louis and State of Minnesota, have invented certain new and useful Improvements in Shock-Absorbers, of which the following is a specification.

My present invention has reference to that class of shock absorbers for motor vehicles, in which an auxiliary spring is provided that is held in suspension between the main spring and the axle or body of the vehicle and connected with the said main spring and axle in such manner that it operates as a means for cushioning the direct and rebound movements of the main and the auxiliary springs.

My said invention has particular reference to improvements in the construction of the shock absorber devices specifically disclosed in my copending application, Serial No. 273,761, filed January 29, 1919, and primarily my present invention seeks to provide certain improved features of construction having special reference to the means for joining the auxiliary or cushioning spring elements to a perch fixedly attached to the front axle, or to the brake drum, when my present construction of auxiliary or cushioning springs are attached to the rear main spring.

My present invention also seeks to provide certain improvements in the means that connect the auxiliary or cushioning springs to their respective ends of the main spring with which they coöperate, for limiting the direct thrust as also the upward thrust or rebound movements of the spring.

With the above objects in view and other objects that will hereinafter appear, my invention, in its more subordinate features, embodies certain details of construction and peculiar combination of parts as will be fully set forth in the following description, specifically pointed out in the appended claims and illustrated in the accompanying drawing, in which:

Figure 1 is a front elevation of a portion of an automobile and illustrates the simplest form of my present shock absorber, the same being especially designed for use on the front axle and the corresponding main spring, and the rocker and perch connection mounted on the said front axle.

Fig. 2 is a perspective view of the rocker that constitutes a part of the perch connection shown in Fig. 1.

Fig. 3 is a detail cross section of the hanger connections that joins the outer end of the upper or turned back portion of the auxiliary spring device with the main spring and taken on the line 3—3 on Fig. 1.

Fig. 4 is an elevation of one of the rear wheels, a portion of the rear axle with the brake drum and illustrates a somewhat modified construction of the auxiliary spring, the latter being especially designed for use in connection with the rear axle and the perch devices connected to the brake drum.

Fig. 5 is a cross section taken on the line 5—5 on Fig. 4.

Fig. 6 is a perspective view of the perch and shows the construction illustrated in Fig. 4.

In the practical arrangement of my present form of shock absorber and when it is especially designed for use in connection with the front axle and the front main spring, as shown in Fig. 1, the auxiliary or cushion spring devices, which are held in suspension between the main spring and the axle of the vehicle, consist of a plurality of leaves or spring plates comprising a lower inwardly extending set 4 and an upper set 3, the lower ones being connected at their outer ends to a perch 1 that is fixedly attached to and projected upwardly from the front axle 2.

The upper set 3 of the spring plates, which join with and extend outwardly from the inner end of the lower set 4 of spring plates and the outer or free ends thereof, are connected to the corresponding outer end of the main spring 5 in the manner best shown in Figs. 1 and 2.

In my construction of shock absorber devices, the auxiliary or cushioning elements, the spring members 3 and 4, are joined together to constitute a substantially rigid inner end which inner end is supported upon the top of the main spring in such manner that under the shock adjustments, the said inner end of the cushioning or auxiliary spring device rides back and forth, lengthwise of the main spring, as will hereinafter be more fully explained.

When designed for use for coöperation with the front main spring and the front gear of the vehicle where the shocks, incident in the travel over rough surfaces, are not as severe as is imparted to the rear spring and the rear axle, the lower set 4 of the spring plates, preferably consists of three members of uniform length and they are bent upwardly from the outer end and terminate in a straight portion which extends inwardly over the corresponding end of the main spring 5 and rests on top of the said spring, as is best shown in Fig. 1, by reference to which it will be seen the top set 3 of the spring members is composed of two flat springs, the inner ends of which lie flatwise upon and are secured to the straight inner end of the lower set 4 of the spring plates, and to hold the inner ends of the upper and lower sets of spring plates in proper connection, a substantially U-shaped clamp 67 extends over the inner end of the spring plates and is secured thereto by a bolt 68 that passes through the overlapping portion of the clamp 67 and the spring plates, as shown.

69 designates a clamp bolt that passes through and clamps the upper and lower sets of spring leaves together, at a point some distance from the clamp connections 67 68 on the innermost end of the spring plates.

The upper one of the upper spring plates 3 extends outwardly some distance from the next or adjacent one of the said upper plates and terminates in an eye or loop 3ᵃ, within which is held a bushing 15 through which passes a pivot and clamping bolt 14, as is clearly shown in Fig. 3, by reference to which it will be observed the spring plate loop 3ᵃ has an oil hole 16 that registers with an aperture 16ᵃ in the bushing and through which the lubricant may pass to the bolt.

11—11 indicate a pair of hangers or links whose upper ends are hung on the bolt 14 and the said hangers straddle the lower sets of spring plates 4 and their lower ends connect with a cross stud 36 that passes through the eye 23 on the outer end of the lowermost one of the plates that constitute the main spring 5.

The said lower ends of the hangers 11—11 are held clamped to the opposite ends of the cross stud or bolt 36 by clamp nuts 36ᵃ, 36ᵃ, as shown.

The hangers 11—11 each have a plurality of apertures 13, 13 for receiving one or more clamping bolts 35 that tend to hold the hangers against buckling or working loose and somewhat near their upper end, each hanger has an inwardly projected stop lug 12, the reason for which will presently appear.

As before stated, when my improved shock absorbing devices are to be used in connection with the front axle and the front main spring, the auxiliary spring or cushioning element is secured at the outermost end of the lower sets of spring plates 4 to a perch secured to project upwardly from the front axle.

In my present construction of shock absorber and when arranged as in Fig. 1, the auxiliary or spring suspension is connected at its lower and outermost end to a rocker 40, the construction of which is best shown in Fig. 2, by reference to which it will be observed the said rocker 40 includes a pair of oppositely disposed apertured ears 42, 42 pendent from a top piece 41 that extends inwardly beyond the ears 42, 42 and terminates in upturned members 37, 37 which embrace and hold the outer end of the lower section of the auxiliary spring, which end extends beyond the ears 37 and rests upon the top piece or seat 41 to which the ends 39 of the lower spring section are fixedly held by the bolt 38 that passes through the said spring ends 39 and 40 and threads into an internally threaded aperture 48 in the said seat 41.

The rocker device also includes a pendent member 41ᵃ at the outer or front end, to which is adjustably connected a stop bolt 44, which bolt, in practice, may be set, as needed, so the auxiliary or cushioning spring cannot, on the rebound, go any higher than that for which the bolt 44 is set.

It should be here stated that the lugs 12, 12 on the hangers 11, 11, see Fig. 3, limit the downward thrust of the flexible outer end of the upper section of the auxiliary spring, when arranged as in Fig. 1, since, when forced down to the limit, the said lugs or stops 12, 12 engage the lower section 4 of the said auxiliary spring.

A bolt 45 takes through the apertured ear 42 of the rocker element and through a bushing mounted on the looped end of the lowermost spring plate 47.

In Fig. 4, I have illustrated a somewhat modified form of my present type of shock absorbing devices and the arrangement of the parts shown in the said figure, while embodying the same generic characteristics of the construction of my shock absorber devices, when designed for use on the front axle and spring, are especially designed for use in connection with the rear main spring and the rear axle, the parts thereof being particularly arranged and combined to adapt them for the heavier work, that is for taking up the shocks developed by the rear wheels and the axle therefor, when passing over rough places in the road.

The auxiliary spring, in the form shown in Fig. 4, instead of being composed of two independent sections, an upper and a lower one, is composed of a plurality of spring plates, the number of which may be either one, preferably four as shown, or six or more as the character of the automobile to which my absorber devices are to be applied and may make desirable.

In the modified form, Fig. 4, before referred to, the auxiliary spring is composed of two spring members designated $a$ and $b$, the lowermost one $a$ of which starts at a loop B, runs back with the other member $b$ back to A, when it turns into a loop and then extends upon itself outwardly, the extremity of the outermost member $a$ terminating in a loop $16^b$ that connects with the bolt and hangers 11—11, the same as is the case in the other or simpler structure of my absorber, as is shown in Fig. 1.

In the said modified form, two other spring members 6 and 8 of considerable less length than the outermost members $a$ and $b$ are provided and the said members 6 and 8 are bent back upon themselves and fit between the loop or bent spring members $a$ and $b$, the said members 6 and 8, when bent to the shape as shown, fall within the opposing upper and lower sections of the spring members $a$ and $b$ with the innermost or looped end thereof positioned some distance outward from the looped end $a$ of the spring members $a$ and $b$, so as to accommodate a clamp device that tends to hold the said loop or inner end of the said spring members in contact with the corresponding end of the main spring 5 and to allow the said looped end of the auxiliary spring device to creep back and forth in the direction of the length of the said main spring.

Instead of using a simple substantially U-shaped clamp for holding the inner end of the auxiliary spring down in engagement with the main spring in the modified form shown in Fig. 4, I use a clamp that includes a transverse or cross member 19 that extends across and engages the top face of the lower section of the auxiliary spring and the said member is integral with a pair of oppositely disposed curved members 17 and 18 that engage the looped end A and the looped edge of the spring members 6 and 8, as is clearly shown in Figs. 4 and 5, by reference to which it will be also noted the modified form of clamp also includes a pair of oppositely disposed pendent or side members 20. each of which has an elongated horizontal groove 54, 54 in which ride the opposite ends of a roller bearing 55 that travels upon the corresponding end of the main spring and insures an easy riding of the inner end of the auxiliary spring along the main spring, as the cushion or auxiliary spring expands and contracts, when shifted as the vehicle hits the depressions or low spots in the road.

As before noted, and as clearly shown in Fig. 4, the upper outer end of the auxiliary spring is joined through a link connection with the main spring, the same as is the case in the other or simpler construction that is particularly adapted for the front axle and the front main spring, as shown in Fig. 1, but, in the said modified form, the perch is connected to the brake drum in the manner best shown in Fig. 4 and as will be now mentioned in detail.

The perch for the rear main spring is connected to the brake drum 32, it being fastened thereto by one or more bolts 31, the square heads of which engage like sockets 32 in the base member 24, as indicated by dotted lines on Fig. 4.

The rear perch includes an upwardly extended slotted member 25, the upper or cross portion of which constitutes a stop 26 with which the stops 12, 12 on the hangers 11, 11 engage, when the auxiliary or cushioning spring moves downwardly under the compression shock, as indicated by the broken line $x$ on Fig. 4.

The perch referred to also includes a pair of outwardly extended arms 27, 27, one of which has a round aperture $27^a$ and the other a square aperture $27^b$, the latter serving to hold the head of the bolt that takes through a bushing 30 to which the loop on the end of the outermost member of the main spring is connected, as is clearly shown in Fig. 4, which also indicates that the said outer end of the main spring passes through the slotted extension 25, such connection providing for holding the end of the spring from lifting too high, the cross member 26 constituting a stop.

A supplemental clamp that serves the function of the bolt 69 on Fig. 1, in the nature of a clip 9, takes over the several upper and lower sets of spring members, when arranged as shown in Fig. 4. The top of the clamp is made fast to the uppermost spring member by a set screw 90 and the lower ends of the clip member terminates in threaded extension that takes through the outer ends of the clip bar 10, which is held up against the under side of the lowermost spring members by nuts, as shown.

From the foregoing description taken in connection with the accompanying drawing, the complete construction, the manner of its operation under the shocks incident in the use of motor vehicles and the advantages of my invention will be readily apparent to those skilled in the art to which my said invention relates.

Among the advantages of my present invention is that the shock absorber has a certain travel along the main spring and in such manner that all the joints or connecting members have sufficient resiliency to give under all kinds of shocks imparted to either of the forms of my present invention, as shown.

The clamp that connects the auxiliary spring device to the main spring and the perches serve to hold the main and the auxiliary springs in a substantially correct position under all deflections imparted thereto, when traveling over rough places.

It should be stated that when my improved shock absorbing devices are applied to the front spring and axle, as shown in Fig. 1, the cross bolt 35 indicated on Fig. 3 is omitted, since in this form should the compression of the free end of the upper set of spring plates be excessive, the stops 12 on the hangers 11 are free to engage with the lower set of spring plates 4.

When applied as in Fig. 4, the bolt 35 is used, as in this form, the stops 12 engage the portion 26 of the perch.

While I have illustrated and described the preferred forms of my present construction of shock absorbers, it is to be understood I do not limit myself to the exact details and combinations shown, since they may be readily further modified without departing from my invention as comes within the scope of the appended claims.

What I claim is:

1. In combination with the axle and the regular main spring of a vehicle; of a shock absorber comprising an auxiliary spring consisting of upper and lower portions that extend over the corresponding end of the main spring, the said portions being connected at their inner end to each other, the said inner end of the auxiliary spring normally resting upon and having slidable movement along the main spring, a fixedly held perch, the outer end of the lower portion of the auxiliary spring being pivotally connected with the perch and an oscillatable connection that joins the outer end of the upper portion of the auxiliary spring with the corresponding end of the main spring, means for holding the inner end of the auxiliary spring in contact with the main spring.

2. In combination with the axle and the regular main spring of a vehicle; of a shock absorber comprising an auxiliary spring consisting of upper and lower portions that extend over the corresponding end of the main spring, the said portions being connected at their inner end to each other, the said inner end of the auxiliary spring normally resting upon and having slidable movement along the main spring, a fixedly held perch, the outer end of the lower portion of the auxiliary spring being pivotally connected with the perch and an oscillatable connection that joins the outer end of the upper portion of the auxiliary spring with the corresponding end of the main spring, means for holding the inner end of the auxiliary spring in contact with the main spring, the said means comprising a clamp that straddles the main spring and whose opposite side portions have elongated grooves and a roller bearing between the main and the auxiliary springs whose ends are guided in the said elongated grooves.

3. The combination with the axle, the main spring located adjacent the axle and a rigidly supported perch; of an auxiliary spring that comprises upper and lower resilient portions joined at their inner end, a pivotal connection that joins the outer end of the lower auxiliary spring portion to the perch, the said connections consisting of a rocker pivotally sustained on the perch, the said rocker having a seat upon which the outer end of the lower portion of the auxiliary spring is supported, the said rocker including members that engage the opposite sides of the said outer end of the springs and means that flexibly connects the outer end of the upper spring portion to the corresponding outer end of the main spring.

4. In a shock absorber, the combination with the axle and the main spring adjacent thereto; of a shock absorber comprising an auxiliary spring held over the corresponding end of the main spring, the said auxiliary spring comprising a number of spring plates bent upon themselves to constitute upper and lower spring portions, the outer or free ends thereof being separated, an oscillatable connection that joins the outer end of the upper spring portion with the corresponding outer end of the main spring, the outer end of the lower spring portion being pivotally mounted with respect to the axle, a second number of spring plates of less length than the other aforesaid spring plates, bent upon themselves and fitted within the said other spring plates between the ends thereof, whereby a space is provided at the looped end of the outermost spring plates, and a clamp device that includes a member which passes through the space at the looped end of the outermost spring plates, and a clip connection that secures the clamp device onto the main spring.

5. In the shock absorber, the combination with the axle and the main spring adjacent thereto; of a shock absorber comprising an auxiliary spring held over the corresponding end of the main spring, the said auxiliary spring comprising a number of spring plates bent upon themselves to constitute upper and lower spring portions, the outer or free ends thereof being separated, an oscillatable connection that joins the outer end of the upper spring portion with the corresponding outer end of the main spring, the outer end of the lower spring portion being pivotally mounted with respect to the axle, a second number of spring plates of less length than the other aforesaid spring plates, bent upon themselves and fitted within the said other spring plates between the ends thereof, whereby a space is provided at the looped end of the outermost spring plates, and a clamp device that includes a member which passes through the space at the looped end of the outermost spring plates, and a clip connection that secures the clamp device onto the main spring, and another device that clamps the several sets of spring plates together midway the inner and outer ends thereof.

6. In combination with the axle and the regular main spring of a vehicle; of a shock absorber comprising an auxiliary spring composed of upper and lower portions adapted for being extended lengthwise over the end of the main spring, the said upper and lower spring portions being connected at their inner end, a fixedly held perch with which the outer end of the lower spring portion pivotally connects, an oscillatable hanger connection pivotally joined at one end to the outer end of the upper auxiliary spring portion and connected at the lower end to the corresponding end of the main spring, and a stop for limiting the compression of the upper portion of the auxiliary spring.

7. In combination with the axle and the regular main spring of a vehicle; of a shock absorber comprising an auxiliary spring composed of upper and lower portions adapted for being extended lengthwise over the end of the main spring, the said upper and lower spring portions being connected at their inner end, a fixedly held perch with which the outer end of the lower spring portion pivotally connects, an oscillatable hanger connection pivotally joined at one end to the outer end of the upper auxiliary spring portion and connected at the lower end to the corresponding end of the main spring, and a stop for limiting the compression of the upper portion of the auxiliary spring, the said perch including a vertically slotted member through which the pivoted end of the lower portion of the auxiliary spring passes.

8. In combination with the axle and the regular main spring of a vehicle; of a shock absorber comprising an auxiliary spring composed of upper and lower portions adapted for being extended lengthwise over the end of the main spring, the said upper and lower spring portions being connected at their inner end, a fixedly held perch with which the outer end of the lower spring portion pivotally connects, an oscillatable hanger connection pivotally joined at one end to the outer end of the upper auxiliary spring portion and connected at the lower end to the corresponding end of the main spring, and a stop for limiting the compression of the upper portion of the auxiliary spring, the said perch including a vertically slotted member through which the pivoted end of the lower portion of the auxiliary spring passes, said stop consisting of cross lugs on the hangers adapted, under compression of the upper portion of the auxiliary spring, to engage with another and relatively stationarily held part.

9. In combination with the axle and the regular main spring of a vehicle; of a shock absorber comprising an auxiliary spring composed of upper and lower portions adapted for being extended lengthwise over the end of the main spring, the said upper and lower spring portions being connected at their inner end, a fixedly held perch with which the outer end of the lower spring portion pivotally connects, an oscillatable hanger connection pivotally joined at one end to the outer end of the upper auxiliary spring portion and connected at the lower end to the corresponding end of the main spring, and a stop for limiting the compression of the upper portion of the auxiliary spring, the said perch including a vertically slotted member through which the pivoted end of the lower portion of the auxiliary spring passes, said stop consisting of cross lugs on the hangers adapted, under compression of the upper portion of the auxiliary spring to engage with another and relatively stationarily held part, the said part comprising a stop portion on the perch for being engaged by the said stop lugs on the hanger.

CHARLES A. WIBERG.

Copies of this patent may be obtained for five cents each, by addressing the "Commissioner of Patents, Washington, D. C."